April 15, 1969   J. F. PAULSEN   3,438,639
PACKING DEVICES FOR ROTATING SHAFTS
Filed March 24, 1966

United States Patent Office 3,438,639
Patented Apr. 15, 1969

3,438,639
PACKING DEVICES FOR ROTATING SHAFTS
Jean Felix Paulsen, Chateaudun, France, assignor to Luxembourgeoise de Brevets et de Participations
Filed Mar. 24, 1966, Ser. No. 537,154
Claims priority, application France, Mar. 30, 1965, 11,301
Int. Cl. F16j 15/36, 15/32
U.S. Cl. 277—84
4 Claims

ABSTRACT OF THE DISCLOSURE

The packing device comprises a packing joint of resilient material comprising a first lip and a second lip. The first lip is applied axially against a first, transverse surface portion carried by the rotating shaft, and a second lip is applied radially against a second, cylindrical surface portion carried by the rotating shaft.

---

The present invention relates to packing devices for rotating pieces and in particular shafts.

The chief object of the present invention is to provide a packing device of this kind which is better adapted to meet the requirements of practice than those used up to this time for the same purpose.

According to the main feature of this invention, such a packing device made of a resilient plastic material comprises lips adapted to be applied in the direction of the rotation axis, on a portion of said surface substantially transverse to the rotation axis.

Another feature of the present invention consists in providing such a packing device with at least two lips, one of them being applied on a cylindrical portion of the rotating surface and the other on a portion of said surface substantially transverse to its rotation axis.

It is reminded that the packing devices for rotating shafts used up to this time generally relate to two types: packing devices having lips and surface packing devices.

A packing device having lips generally comprises a metallic box supporting a diaphragm of rubber or another elastomer ending with a lip applied on the shaft by a concentric spring. This solution has many disadvantages when the shaft has some eccentricity and when the liquid to be stopped comprises powdery and abrasive materials.

A packing device of the surface type comprises a circular rubber diaphragm pressed against the shaft and rotating therewith and, at the periphery, a ring made of a hard material which rubs on a surface portion perpendicular to the rotation axis. Such packing device is cumbersome, expensive, and gives rise to secondary strains because the pressure created by the circular spring is modified by the centrifugal force.

In order to avoid the above mentioned disadvantages, a packing device according to the invention has at least one lip applied in the axial direction on a rotating surface portion substantially transverse to said rotation axis.

Preferred embodiments of the present invention will be hereinafter described with reference to the appended drawings given merely by way of example and in which.

Figure 1:
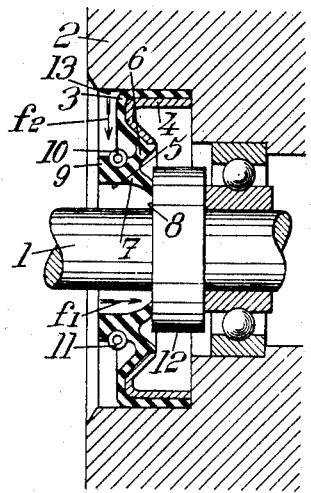
FIG. 1 is an axial section of a shaft and its packing device according to a first embodiment of the invention.

FIG. 1 shows a packing joint for stopping a liquid liable to flow between a shaft 1 and its casing 2. Said packing device is located in a housing 13 of casing 2 and comprises, at the periphery, a resilient ring 3 reinforced by an armature 4 and, in the central portion, a resilient element 5 of a plastic material having substantially a tubular shape. Ring 3 and element 5 are connected with each other through a thin portion 6 acting as an articulation. Element 5 comprises on the one hand a lip 7 adapted to be applied on a surface portion 8 perpendicular to the axis of shaft 1 and rigid therewith and on the other hand a tubular element 9 on which resilient means are applied. Said resilient means consist of a circular spring 10 mounted in a groove 11 of tubular element 9. Circular spring 10 acts in the direction of vector $f_2$.

Under the effect of the concentric pressure of spring 10, element 5 pivots about thin portion 6, which has for its effect to apply lip 7 against surface portion 8 in direction $f_1$. Surface portion 8 is constituted by the lateral face of a shoulder 12 rigid with shaft 1.

Because of the axial effort exerted in direction $f_1$, and suitably distributed on surface portion 8, a good fluid-tightness is obtained independently of a possible eccentricity of shaft 1.

Furthermore, the structure is simple and not cumbersome.

Figure 2:
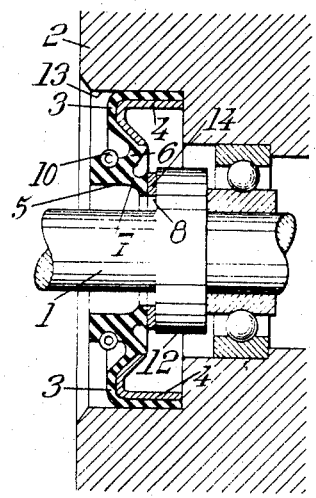
FIGS. 2 and 3 are respectively axial sections of a shaft and its packing device according to two other embodiments of the invention.

When the liquid contains abrasive particles it is advantageous to use, as a friction element, a hard material. FIG. 2 shows that the portion of element 5 forming lip 7 is in contact with surface portion 8 through a ring 14 of a hard material, said ring 14 rubbing flatwise on surface portion 8.

Figure 3:
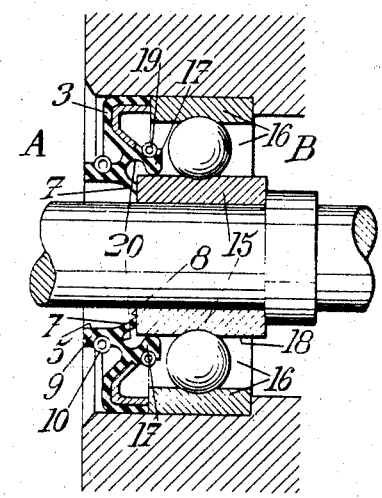

FIG. 3 shows an embodiment wherein surface portion 8 belongs to the inner rings 15 of a ball-bearing 16, and the packing device has two lips, one of them being applied on a surface portion perpendicular to the shaft axis, the other one 17 on a cylindrical surface portion 18 of ring 16 under the effect of spring 19. The annular space 26 located between lip 7 and lip 17 is full of a suitable grease.

Such a packing device (shown in FIG. 3) ensures a fluid-tightness in the two directions: liquid A cannot enter ball bearing 16 and at the same time the lubricant B of ball bearing 16 does not mix with liquid A.

Such a packing device constitutes a single-unit joint having a double tightness. No machining is necessary for the bore or for the shaft.

The chief advantage of such a packing device is to be independent of a possible eccentricity of the shaft.

In a general manner while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A packing device for a rotating part which comprises, in combination,
    a casing surrounding said rotating part,
    a piece rigid with said rotating part and having a first surface portion transverse to the axis of said rotating part and a second, cylindrical surface portion coaxial with said rotating part,
    a packing joint of a resilient material located in said casing, said packing joint being provided with a first lip and a second lip,
    and resilient means acting on said packing joint to apply said first lip in the axial direction on said first, transverse surface portion, and to apply said second lip in the radial direction on said second, cylindrical surface portion,
    wherein said packing joint comprises at the periphery an annular portion and at the center a substantially tubular element and interconnecting said annular portion and said substantially tubular element an intermediate portion, said substantially tubular element being provided on the one side with said first lip and on the other side with a portion submitted to said resilient means, and said intermediate portion being provided with said second lip, and wherein said casing is provided with a housing for said annular portion.

2. A packing device according to claim 1 further comprising a metallic armature for reinforcing said annular portion.

3. A packing device according to claim 1 wherein said intermediate portion comprises a thin portion.

4. A packing device according to claim 1 wherein said resilient means comprise, on the one hand, a first circular spring mounted in a first groove formed in said substantially tubular element, and on the other hand, a second circular spring mounted in a second groove formed in said second lip.

References Cited

UNITED STATES PATENTS

| 3,101,954 | 8/1963 | Huddle | 277—39 |
| 2,352,784 | 7/1944 | Geyer | 277—65 X |
| 2,752,177 | 6/1956 | Stevenson | 277—84 |
| 2,866,656 | 12/1958 | Dobrosavljevic | 277—82 |
| 3,061,320 | 10/1962 | Haensch | 277—84 X |
| 3,160,417 | 12/1964 | Mueller | 277—40 |

FOREIGN PATENTS

| 1,017,868 | 10/1957 | Germany. |
| 1,088,300 | 9/1960 | Germany. |

SAMUEL ROTHBERG, *Primary Examiner.*

U.S. Cl. X.R.

308—187.1